US012571912B2

(12) United States Patent
Caute et al.

(10) Patent No.: US 12,571,912 B2
(45) Date of Patent: Mar. 10, 2026

(54) SYSTEM AND METHOD FOR UNDERWATER DISTANCE DETERMINATION

(71) Applicant: Airmar Technology Corporation, Milford, NH (US)

(72) Inventors: Didier Caute, Lorient (FR); Baptiste Verneau, Carnoet (FR); Bruno Marie, Ploemeur (FR)

(73) Assignee: Airmar Technology Corporation, Milford, NH (US)

( * ) Notice: Subject to any disclaimer, the term of this patent is extended or adjusted under 35 U.S.C. 154(b) by 93 days.

(21) Appl. No.: 18/303,457

(22) Filed: Apr. 19, 2023

(65) Prior Publication Data

US 2024/0353558 A1 Oct. 24, 2024

(51) Int. Cl.
G01S 7/521 (2006.01)
G01S 15/74 (2006.01)

(52) U.S. Cl.
CPC .............. G01S 15/74 (2013.01); G01S 7/521 (2013.01)

(58) Field of Classification Search
CPC .......... G01S 7/521; G01S 15/74; G01S 11/14; G01S 2201/07; G01S 5/18; G01V 1/3835; A01K 73/04
(Continued)

(56) References Cited

U.S. PATENT DOCUMENTS 6,366,533 B1 * 4/2002 English .................. H04B 11/00
367/131
7,062,381 B1 * 6/2006 Rekow ................. G05D 1/0295
342/126
(Continued)

FOREIGN PATENT DOCUMENTS

EP 2850452 B1 4/2020
JP 2022179161 A 12/2022
(Continued)

OTHER PUBLICATIONS

International Search Report and Written Opinion received for PCT Patent Application No. PCT/US2024/025485, mailed on Aug. 7, 2024, 13 pages.

*Primary Examiner* — Daniel L Murphy
*Assistant Examiner* — Amie M Ndure
(74) *Attorney, Agent, or Firm* — Hamilton, Brook, Smith & Reynolds, P.C.

(57) ABSTRACT

A system and corresponding method perform underwater distance determination. The system comprises a hydrophone unit (HU) located at a reference point, a first sensor module (SM), and a second SM, each located underwater. The first SM sends a first sensor-to-hydrophone data signal and a first sensor-to-hydrophone synchronization signal to the HU and sends a first inter-sensor synchronization signal to the second SM. The second SM sends, responsive to receipt of the first inter-sensor synchronization signal from the first SM, a second inter-sensor synchronization signal to the first SM. The second SM sends a second sensor-to-hydrophone data signal to the HU. The first SM measures a time value representing a total travel time of the first inter-sensor synchronization signal from the first SM and second inter-sensor synchronization signal from the second SM and calculates a distance between the first SM and second SM based on the time value measured.

18 Claims, 10 Drawing Sheets

(58) Field of Classification Search
USPC .......................................................... 367/118
See application file for complete search history.

(56) References Cited

U.S. PATENT DOCUMENTS

| | | | | |
|---|---|---|---|---|
| 7,376,045 B2 * | 5/2008 | Falkenberg | ............. | G01S 15/46 367/19 |
| 9,119,383 B2 * | 9/2015 | Skjold-Larsen | ....... | A01K 73/04 |
| 9,151,833 B2 * | 10/2015 | Skjold-Larsen | ....... | A01K 73/04 |
| 2006/0083110 A1 * | 4/2006 | Tietjen | .................. | G01S 15/003 367/127 |
| 2006/0239122 A1 * | 10/2006 | Vigen | .................. | G01V 1/3835 367/19 |
| 2007/0089349 A1 | 4/2007 | Skjold-Larsen | | |
| 2007/0091719 A1 * | 4/2007 | Falkenberg | .......... | G01V 1/3835 367/19 |
| 2007/0159923 A1 * | 7/2007 | Huff | ....................... | A01K 85/01 367/118 |

| | | | | |
|---|---|---|---|---|
| 2008/0192575 A1 * | 8/2008 | Coleman | .................. | G01S 7/60 367/115 |
| 2012/0002507 A1 * | 1/2012 | Skjold-Larsen | ....... | A01K 73/04 367/127 |
| 2014/0230308 A1 | 8/2014 | Skjold-Larsen | | |
| 2014/0301166 A1 * | 10/2014 | Skjold-Larsen | ....... | A01K 73/04 367/129 |
| 2014/0373425 A1 | 12/2014 | Skjold-Larsen | | |
| 2015/0103631 A1 | 4/2015 | Skjold-Larsen | | |
| 2015/0135835 A1 | 5/2015 | Skjold-Larsen | | |
| 2015/0138921 A1 | 5/2015 | Skjold-Larsen | | |
| 2016/0124081 A1 * | 5/2016 | Charlot | ................ | G01S 15/874 367/13 |

FOREIGN PATENT DOCUMENTS

| | | | |
|---|---|---|---|
| WO | 00/02061 A1 | 1/2000 | |
| WO | 2005/088343 A1 | 9/2005 | |

* cited by examiner

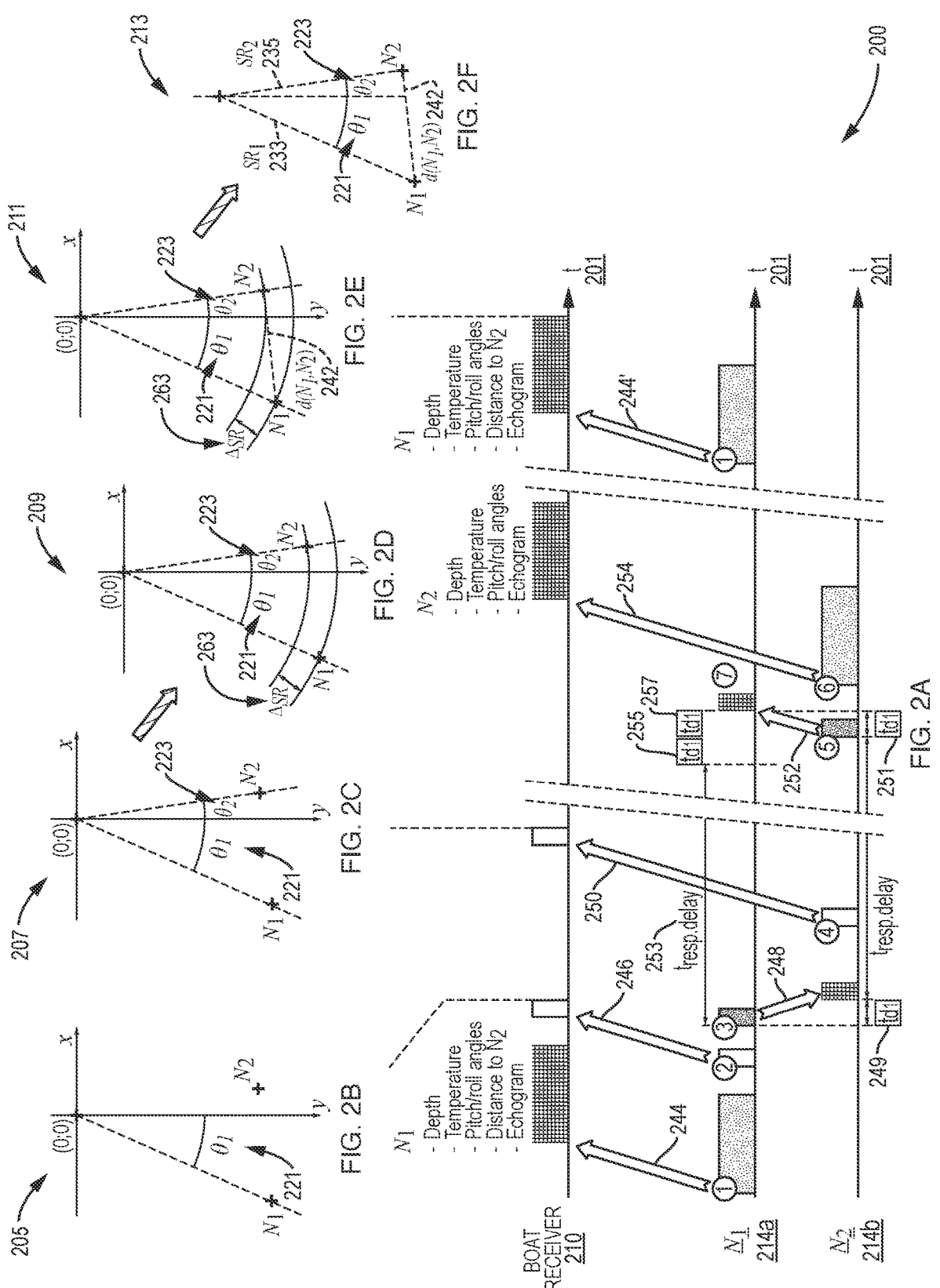

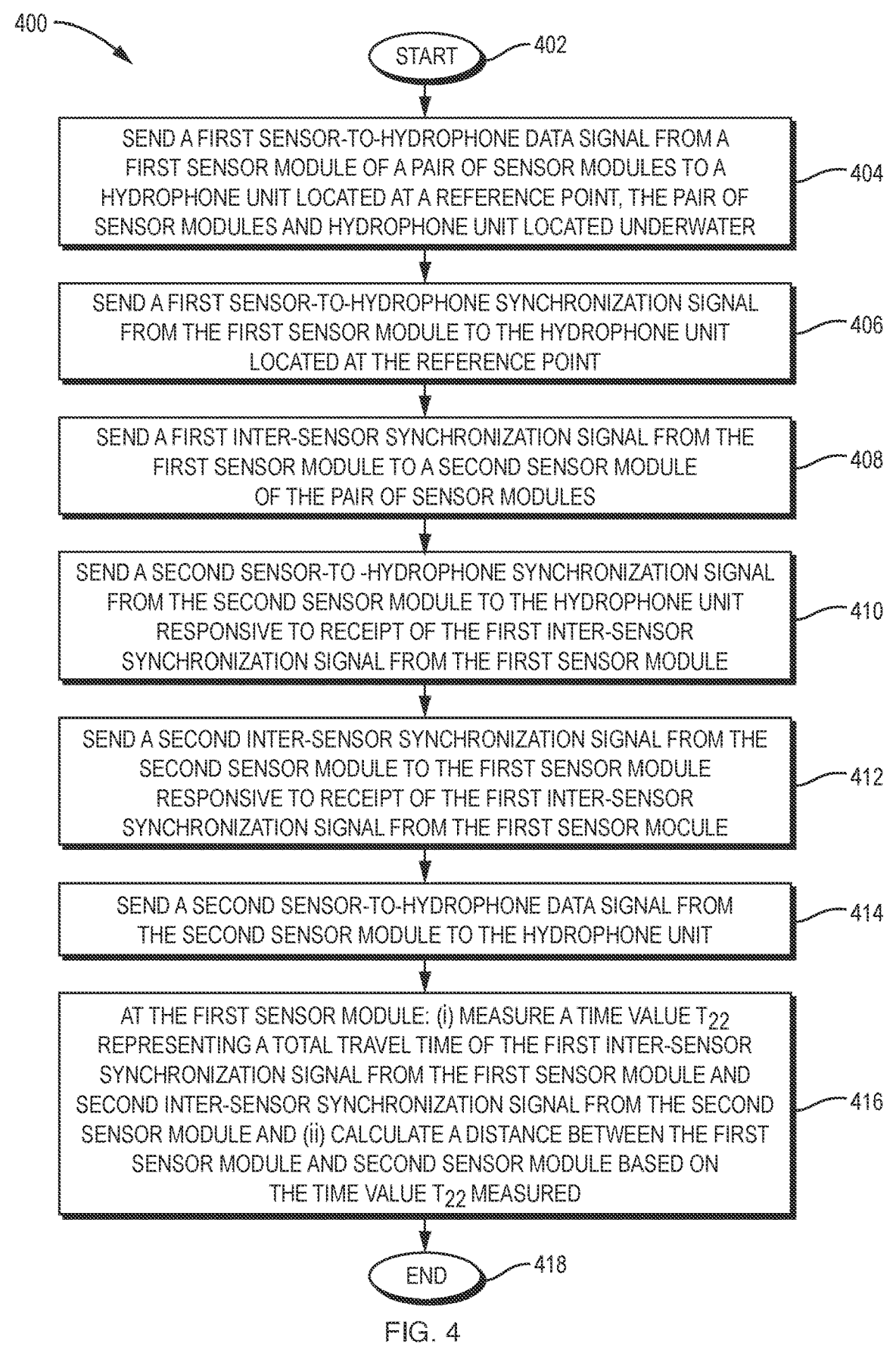

400

START ——402

SEND A FIRST SENSOR-TO-HYDROPHONE DATA SIGNAL FROM A FIRST SENSOR MODULE OF A PAIR OF SENSOR MODULES TO A HYDROPHONE UNIT LOCATED AT A REFERENCE POINT, THE PAIR OF SENSOR MODULES AND HYDROPHONE UNIT LOCATED UNDERWATER ——404

SEND A FIRST SENSOR-TO-HYDROPHONE SYNCHRONIZATION SIGNAL FROM THE FIRST SENSOR MODULE TO THE HYDROPHONE UNIT LOCATED AT THE REFERENCE POINT ——406

SEND A FIRST INTER-SENSOR SYNCHRONIZATION SIGNAL FROM THE FIRST SENSOR MODULE TO A SECOND SENSOR MODULE OF THE PAIR OF SENSOR MODULES ——408

SEND A SECOND SENSOR-TO -HYDROPHONE SYNCHRONIZATION SIGNAL FROM THE SECOND SENSOR MODULE TO THE HYDROPHONE UNIT RESPONSIVE TO RECEIPT OF THE FIRST INTER-SENSOR SYNCHRONIZATION SIGNAL FROM THE FIRST SENSOR MODULE ——410

SEND A SECOND INTER-SENSOR SYNCHRONIZATION SIGNAL FROM THE SECOND SENSOR MODULE TO THE FIRST SENSOR MODULE RESPONSIVE TO RECEIPT OF THE FIRST INTER-SENSOR SYNCHRONIZATION SIGNAL FROM THE FIRST SENSOR MOCULE ——412

SEND A SECOND SENSOR-TO-HYDROPHONE DATA SIGNAL FROM THE SECOND SENSOR MODULE TO THE HYDROPHONE UNIT ——414

AT THE FIRST SENSOR MODULE: (i) MEASURE A TIME VALUE $T_{22}$ REPRESENTING A TOTAL TRAVEL TIME OF THE FIRST INTER-SENSOR SYNCHRONIZATION SIGNAL FROM THE FIRST SENSOR MODULE AND SECOND INTER-SENSOR SYNCHRONIZATION SIGNAL FROM THE SECOND SENSOR MODULE AND (ii) CALCULATE A DISTANCE BETWEEN THE FIRST SENSOR MODULE AND SECOND SENSOR MODULE BASED ON THE TIME VALUE $T_{22}$ MEASURED ——416

END ——418

FIG. 4

SYSTEM AND METHOD FOR UNDERWATER DISTANCE DETERMINATION

BACKGROUND

Measurement of distances between sensor modules underwater and a reference point, which, for non-limiting example, may be a vessel towing the sensor modules behind it, has conventionally been solved by measuring a length of a line or wire between the vessel and sensor modules. An alternative conventional technique may be to send an acoustic signal from a reference point to a sensor module and then measure an amount of time it takes to receive a responding signal from the sensor module.

SUMMARY

According to an example embodiment, a method for underwater distance determination comprises sending a first sensor-to-hydrophone data signal from a first sensor module of a pair of sensor modules to a hydrophone unit located at a reference point. The pair of sensor modules and hydrophone unit are located underwater. The method further comprises sending a first sensor-to-hydrophone synchronization signal from the first sensor module to the hydrophone unit located at the reference point; sending a first inter-sensor synchronization signal from the first sensor module to a second sensor module of the pair of sensor modules; sending a second sensor-to-hydrophone synchronization signal from the second sensor module to the hydrophone unit responsive to receipt of the first inter-sensor synchronization signal from the first sensor module; sending a second inter-sensor synchronization signal from the second sensor module to the first sensor module responsive to receipt of the first inter-sensor synchronization signal from the first sensor module; and sending a second sensor-to-hydrophone data signal from the second sensor module to the hydrophone unit. The method further comprises, at the first sensor module, (i) measuring a time value $T_{22}$ representing a total travel time of the first inter-sensor synchronization signal from the first sensor module and second synchronization signal from the second sensor module and (ii) calculating a distance between the first sensor module and second sensor module based on the time value $T_{22}$ measured.

The hydrophone unit may include at least two hydrophones and the method may further comprise employing the at least two hydrophones to measure a first bearing angle and a second bearing angle of the first sensor module and second sensor module, respectively. The first bearing angle and second bearing angle are relative to the reference point.

The method may further comprise measuring, at a first hydrophone of the at least two hydrophones, a time value $T_{1A}$ representing an arrival time at the first hydrophone of the first sensor-to-hydrophone synchronization signal from the first sensor module. The method may further comprise measuring, at a second hydrophone of the at least two hydrophones, a time value $T_{1B}$ representing an arrival time at the second hydrophone of the first sensor-to-hydrophone synchronization signal from the first sensor module. The method may further comprise calculating, based on the time value $T_{1A}$ and the time value $T_{1B}$, a first bearing angle of the first sensor module relative to the reference point. The reference may be located on an axis. The method may further comprise measuring, at the first hydrophone, a time value $T_{2A}$ representing an arrival time at the first hydrophone of the second sensor-to-hydrophone synchronization signal from the second sensor module. The method may further comprise measuring, at the second hydrophone, a time value $T_{2B}$ representing an arrival time at the second hydrophone of the second sensor-to-hydrophone synchronization signal from the second sensor module and calculating, based on $T_{2A}$ and $T_{2B}$, a second bearing angle of the second sensor module relative to the reference point located on the axis.

The first sensor-to-hydrophone data signal may include a previous distance value representing a previously known distance between the first sensor module and the second sensor module. The method may further comprise calculating a difference between a first distance value from the first sensor module to the reference point and a second distance value from the second sensor module to the reference point based on the previous distance value, the time value $T_{1A}$, the time value $T_{1B}$, the time value $T_{2A}$, and the time value $T_{2B}$. The method may further comprise determining which sensor module, of the first and second sensor modules, is closest to the reference point based on the difference calculated.

Calculating the difference may include subtracting delays that are not due to acoustic wave travel. The delays subtracted may include a first delay and a second delay. The first delay may be between a time of sending the first sensor-to-hydrophone synchronization signal from the first sensor module and a time of sending the first inter-sensor synchronization signal from the first sensor module. The second delay may be between a time of reception, at the second sensor module of the first inter-sensor synchronization signal from the first sensor module and a time of sending the second inter-sensor synchronization signal from the second sensor module.

The method may further comprise calculating the first distance value from the first sensor module to the reference point and calculating the second distance value from the second sensor module to the reference point, based on: (i) the first and second bearing angles calculated; (ii) the difference calculated between the first distance value from the first sensor module to the reference point and the second distance value from the second sensor module to the reference point; and (iii) a result of the determining of which sensor module is closest to the reference point.

Calculating the first and second distance values may include solving a system of equations.

Calculating the first and second distance values may include employing a dichotomy-based process.

The first sensor-to-hydrophone data signal may include a previous distance value representing a previously known distance between the first sensor module and the second sensor module and at least one of: a battery charge level, a temperature value of water surrounding the first sensor module, values representing pitch and roll angles of the first sensor module, a value representing depth of the first sensor module, and data of an echogram recorded at the first sensor module.

The second sensor-to-hydrophone data signal may include at least one of: a battery charge level, a temperature value of water surrounding the second sensor module, values representing pitch and roll angles of the second sensor module, a value representing depth of the second sensor module, and data of an echogram recorded at the second sensor module.

According to another example embodiment, a system for underwater distance determination may comprise a hydrophone unit located at a reference point and a pair of sensor modules. The pair of sensor modules and hydrophone unit are located underwater. A first sensor module of the pair of sensor modules is configured to send a first sensor-to-hydrophone data signal and a first sensor-to-hydrophone synchronization signal to the hydrophone unit located at the reference point and to send a first inter-sensor synchronization signal from the first sensor module to a second sensor module of the pair of sensor modules. The second sensor module is configured to send, responsive to receipt of the first inter-sensor synchronization signal from the first sensor module, a second sensor-to-hydrophone synchronization signal from the second sensor module to the hydrophone unit and a second inter-sensor synchronization signal from the second sensor module to the first sensor module. The second sensor module is further configured to send a second sensor-to-hydrophone data signal from the second sensor module to the hydrophone unit. The first sensor module is further configured to: (i) measure a time value $T_{22}$ representing a total travel time of the first inter-sensor synchronization signal from the first sensor module and second synchronization signal from the second sensor module; and (ii) calculate a distance between the first sensor module and second sensor module based on the time value $T_{22}$ measured.

Alternative system embodiments parallel those described above in connection with the example method embodiment.

It should be understood that example embodiments disclosed herein can be implemented in any combination and in the form of a method, apparatus, system, or non-transitory computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1A-2 is an exemplification of imaginary axes of a vessel.

FIGS. 2A-F represent a chronogram of example embodiments of a system for underwater distance determination.

FIG. 4 is a flow diagram of an example embodiment of a method for underwater distance determination.

DETAILED DESCRIPTION

Figures 1, 1A:
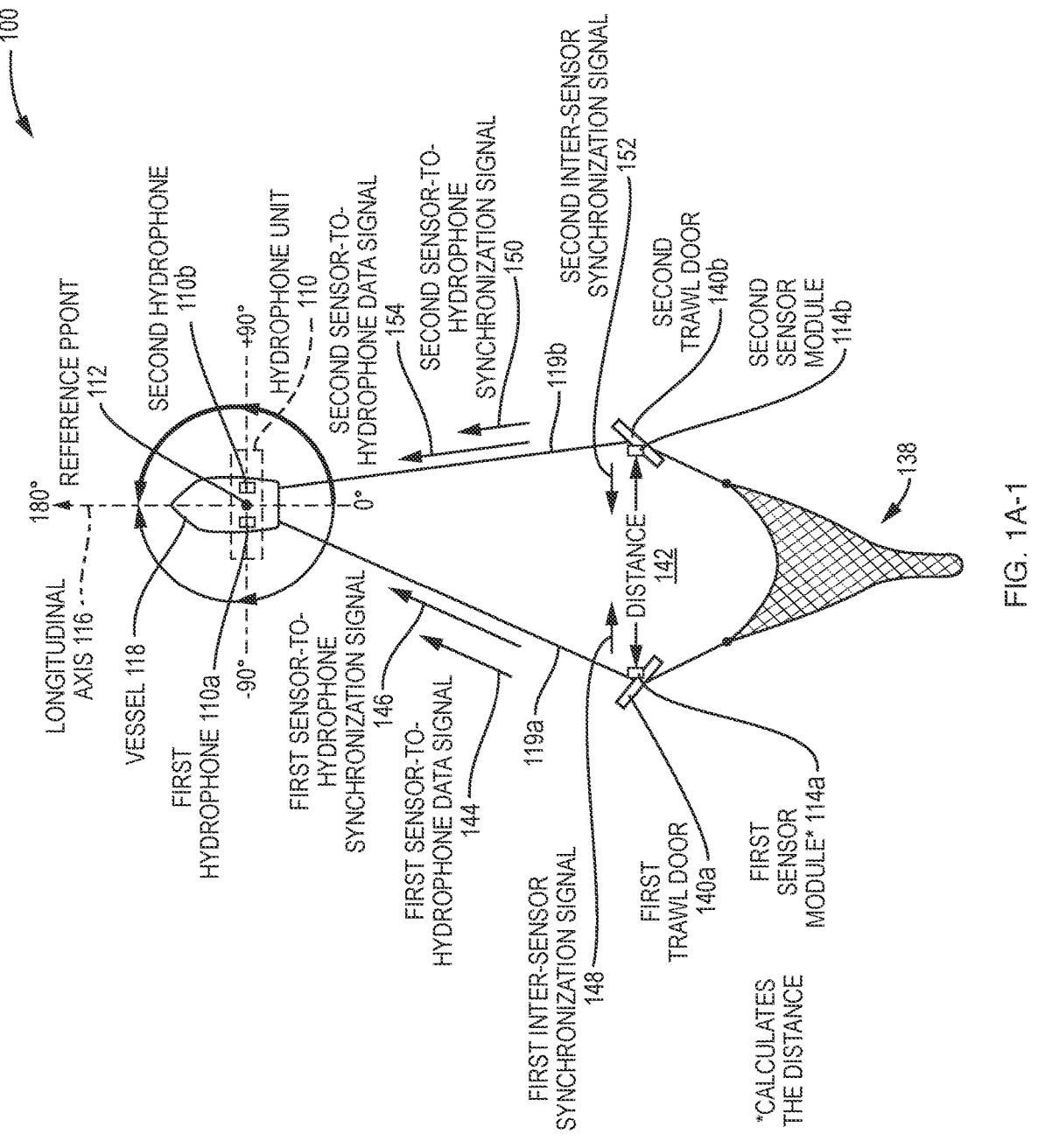
FIG. 1A-1 is a top view of an example embodiment of a system for underwater distance determination.

A description of example embodiments follows.

It should be understood that a "data" signal and "synchronization" signal referred to herein are acoustic signals. According to an example embodiment, a data signal may be an acoustic signal that includes transmitted data, such as measurement values and echogram data for non-limiting examples. A synchronization signal may be an acoustic signal that is formatted and emitted for accurate synchronization time detection.

Trawling is a method of fishing that involves pulling a fishing net through the water behind one or more vessels. The net used for trawling is called a trawl. Trawling employs netting bags (trawls) which are towed through water to catch different species of fish or targeted species of fish. Twin trawling involves towing two trawls side by side. While an example embodiment disclosed herein may be described with respect to trawling or positioning a trawl, it should be understood that such an embodiment is not limited thereto. An example embodiment disclosed herein may be useful for performance of various types of operations that take place underwater, for example, in fisheries for non-limiting example. An example embodiment disclosed herein may be useful for operation of equipment, towing of fishing gear, seismic shooting, the installation of pipelines and/or subsea cables, etc., for non-limiting examples.

A conventional technique employed by devices for measuring distances underwater is to emit a sound wave and measure the time it takes before the same sound wave is reflected. For example, to find the distance from a vessel (boat, ship) to one or more sensor modules, a sonar principle can be used by emitting a sound wave from the vessel and receiving reflections or transmitted signals from sensor modules towed behind the vessel. The time the sound waves take to pass to or from the sensor modules will then be proportional to the distance between them and the vessel. A well-known problem when using sound waves underwater is that the sound propagation velocity is dependent on a number of factors, such as water temperature, salt content, pressure, etc. These will vary according to location, season, current conditions, etc.

An example embodiment of a system for underwater distance determination disclosed herein may comprise a hydrophone unit located at a reference point and a pair of sensor modules, all of which are located underwater. A hydrophone is a microphone designed to be used underwater for recording or listening to underwater sound. For non-limiting example, a hydrophone may be based on a piezoelectric transducer that generates an electric potential when subjected to a pressure change, such as a sound wave. According to an example embodiment, the hydrophone unit may employ at least two hydrophones and employ same for measuring bearing angles for the underwater distance determination. For non-limiting example, the system may be used for precise adjustment and positioning of a trawl, as disclosed below with regard to FIG. 1A-1.

FIG. 1A-1 is a top view of an example embodiment of a system 100 for underwater distance determination. The system 100 comprises a hydrophone unit 110 located at a reference point 112 and a pair of sensor modules, namely a first sensor module 114a and a second sensor module 114b that may move in relation to the vessel 118. The first sensor module 114a may be a port side sensor module whereas the second sensor module 114b may be a starboard side sensor module. The pair of sensor modules 114a, 114b and hydrophone unit 110 are located underwater. As such, the first sensor module 114a and second sensor module 114b may be referred to interchangeably herein as underwater sensor modules. In the example embodiment of FIG. 1A-1, the sensor modules 114a, 114b are towed behind the vessel 118 via a line/wire 119a, 119b that may be fastened to trawl winches (not shown) for non-limiting example.

The sensor modules 114a, 114b may be equipped with depth pressure cells, acoustic height indicators, and processors for non-limiting examples. The sensor modules 114a, 114b include means for sending and receiving acoustic/data signals to each other and the hydrophone unit 110 at the reference point 112. While the reference point 112 is located at the vessel 118 in the example embodiment, it should be understood that the reference point 112 is not limited to being located at the vessel 118 and may, for example, be located at a fixed structure, and the sensor modules 114a, 114b may move in relation to the fixed structure. In the example embodiment of FIG. 1A-1, the reference point 112 is located on a longitudinal axis 116 of the vessel 118. The longitudinal axis 116 may also be referred to interchangeably herein as a vessel axis and is an imaginary axis, as disclosed below with regard to FIG. 1A-2.

Figures 1, 1A, 2:
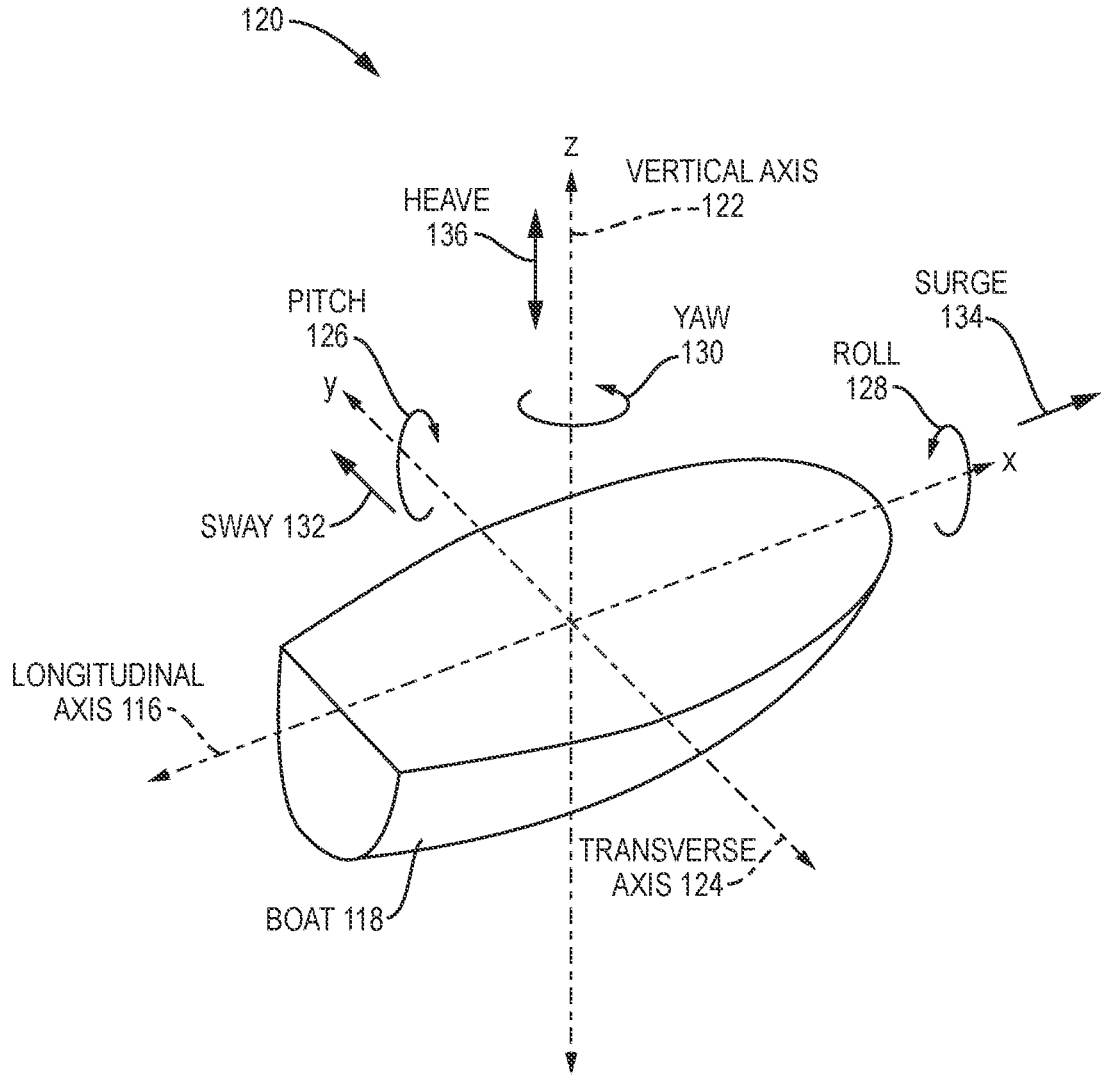

FIG. 1A-2 is an exemplification of imaginary axes 120 of the vessel 118 of FIG. 1A-1. The imaginary axes 120 include the longitudinal axis 116, vertical axis 122, and transverse axis 124, also referred to interchangeably herein as the x-axis, z-axis, and y-axis, respectively. Movement of the vessel 118 may be experienced in water. Such movement may be described as pitch 126, roll 128, yaw 130, sway 132, surge 134, and heave 136. Pitch 126 describes the up and down motion of the vessel 118. This is characterized by the rising and falling of the bow and stern in much the same way as a teeter-totter moves up and down. The roll 128 motion describes the tilting motion of the vessel 118 from side to side as wind and waves push against the vessel 118 and cause it to rock back and forth. The yaw 130 motion spins the vessel 118 on the vertical axis 122, similar to swiveling on a chair. Such motion can be caused by waves moving perpendicular relative to the motion of the vessel 118 and can change its heading, or direction.

With reference back to FIG. 1A-1, the system 100 may, for non-limiting example, be used for adjusting and positioning a trawl 138 in order to obtain optimal trawl geometry and towing speed throughout a trawl haul. In order to carry out efficient fishing operations, and to optimize fuel consumption, it is useful to have a high level of precision for measurements that are used to optimize a trawl operation. According to an example embodiment, the first sensor module 114a and second sensor module 114b may move in relation to the vessel 118 and may be coupled to a first trawl door 140a and second trawl door 140b, respectively, the position of which it may be useful to control and change.

For optimal control of the trawl 138 it is useful to aim for optimal trawl geometry and towing speed throughout the trawl haul, also through changes in course, engine speed, propeller pitch, winches (not shown) and changes in angles of the trawl doors 140a, 140b and sinkers (not shown). A complete system (not shown) for adjusting and positioning the trawl 138 in order to obtain optimal trawl geometry and towing speed throughout a trawl haul may use the hydrophone unit 110 and first and second sensor modules 114a. Such a system may further employ an echo sounder, sonar, trawl sonar, global positioning sensor (GPS), wind gauge, seabed chart, wave gauge, and/or winch data for non-limiting examples. According to an example embodiment, a calculating unit (not shown) may be configured to employ a distance calculated between the first sensor module and second sensor module toward effecting a change in a course of the vessel 118, engine speed, propeller pitch, winches, angle of the trawl doors (140a, 140b, and/or sinkers for non-limiting example. Such a distance may be advantageously calculated by the first sensor module 114a, as disclosed below.

The first sensor module 140a of the pair of sensor modules may be configured to send a first sensor-to-hydrophone data signal 144 and a first sensor-to-hydrophone synchronization signal 146 to the hydrophone unit 110 located at the reference point 112 and to send a first inter-sensor synchronization signal 148 from the first sensor module 140a to a second sensor module 114b of the pair of sensor modules. The second sensor module 114b may be configured to send, responsive to receipt of the first inter-sensor synchronization signal 148 from the first sensor module 114a, a second sensor-to-hydrophone synchronization signal 150 from the second sensor module 114b to the hydrophone unit 110 and a second inter-sensor synchronization signal 152 from the second sensor module 114b to the first sensor module 114a.

The second sensor module 114b may be further configured to send a second sensor-to-hydrophone data signal 154 from the second sensor module 114b to the hydrophone unit 110. The first sensor module 114a may be further configured to: (i) measure a time value $T_{22}$ (not shown) representing a total travel time of the second synchronization signal 118 from the first sensor module 114a and second inter-sensor synchronization signal 152 from the second sensor module 114b; and (ii) calculate a distance 142 between the first sensor module 114a and second sensor module 114b based on the time value $T_{22}$ measured. The distance 142 may be referred to interchangeably herein as a spread distance between the first trawl door 140a and second trawl door 140b. As such, the time value $T_{22}$ measured may be used to calculate the spread distance between such doors 140a, 140b. The spread distance may be a spread value that may be calculated in meters, for non-limiting example, by the port sensor itself, that is, the first sensor module 114a. Such spread distance, namely the distance 142, may be sent, in turn by the first sensor module 114a, to the vessel 118 via a subsequent sensor-to-hydrophone data signal that is subsequent to the first sensor-to-hydrophone data signal 144.

The first sensor-to-hydrophone data signal 144 may include a previous distance value (not shown) representing a previously known distance between the first sensor module 114a and the second sensor module 114b and at least one of: a battery charge level, a temperature value of water surrounding the first sensor module 114a, values representing pitch and roll angles of the first sensor module 114a, a value representing depth of the first sensor module 114a, and data of an echogram recorded at the first sensor module 114a. The second sensor-to-hydrophone data signal 154 may include at least one of: a battery charge level, a temperature value of water surrounding the second sensor module 114b, values representing pitch and roll angles of the second sensor module 114b, a value representing depth of the second sensor module 114b, and data of an echogram recorded at the second sensor module 114b. By incorporating temperature measurements either by means of respective temperature sensors in the sensor modules 114a, 114b or by using respective temperature sensors coupled to the sensor modules 114a, 114b, and sending the measured temperature of the water to the hydrophone unit 110, a calculating unit (not shown) on the vessel 118, as disclosed further below, can use the measured temperature for accurate calculation of distance.

Continuing with reference to FIG. 1A-1, the hydrophone unit 110 may include at least two hydrophones. The at least two hydrophones may include a first hydrophone 110a and a second hydrophone 110b. The system 100 may further comprise a calculation unit (not shown). The calculation unit may be configured to employ the at least two hydrophones 110a, 110b to measure a first bearing angle (not shown) and a second bearing angle (not shown) of the first sensor module 114a and second sensor module 114b, respectively. The first bearing angle and second bearing angle may be relative to the reference point 112. The first and second bearing angles may be referred to interchangeably herein as B1 and B2, respectively, and are disclosed further below with regard to FIGS. 1I and 1J. The first distance value and second distance value may be referred to interchangeably herein as a first slant range SR1 and second slant range SR2, respectively, and are disclosed further below with regard to FIG. 1J.

Continuing with reference to FIG. 1A-1, the first hydrophone 110a of the at least two hydrophones may be configured to measure a time value $T_{1A}$ representing an arrival time at the first hydrophone 110a of the first sensor-to-hydrophone synchronization signal 146 from the first sensor module 114a. The second hydrophone 110b of the at least two hydrophones may be configured to measure a time value $T_{1B}$ representing an arrival time at the second hydrophone 110b of the first sensor-to-hydrophone synchronization signal 146 from the first sensor module 114a. The calculating unit may be configured to calculate, based on the time value $T_{1A}$ and the time value $T_{1B}$, the first bearing angle of the first sensor module 114a relative to the reference point 112. The reference point may be located on an axis, namely the longitudinal axis 116 disclosed above with regard to FIG. 1A-2.

Continuing with reference to FIG. 1A-1, the first hydrophone 110a may be further configured to measure a time value $T_{2A}$ representing an arrival time at the first hydrophone 110a of the second sensor-to-hydrophone synchronization signal 150 from the second sensor module 114b. The second hydrophone 110b may be further configured to measure a time value $T_{2B}$ representing an arrival time at the second hydrophone 110b of the second sensor-to-hydrophone synchronization signal 150 from the second sensor module 114b. The calculation unit may be further configured to calculate, based on $T_{2A}$ and $T_{2B}$, the second bearing angle of the second sensor module 114b relative to the reference point 112 located on the axis, that is, the longitudinal axis 116.

The first sensor-to-hydrophone data signal 144 may include a previous distance value (not shown) representing a previously known distance between the first sensor module 114a and the second sensor module 114b. The calculation unit may be further configured to calculate a difference between the first distance value (i.e., SR1) from the first sensor module 114a to the reference point 112 and the second distance value (i.e., SR2) from the second sensor module 114b to the reference point 112 based on the previous distance value, the time value $T_{1A}$, the time value $T_{1B}$, the time value $T_{2A}$, and the time value $T_{2B}$. The calculating unit may be further configured to determine which sensor module, of the first sensor module 114a and second sensor module 114b, is closest to the reference point based on the difference calculated.

To calculate the difference, the calculation unit may be further configured to subtract delays that are not due to acoustic wave travel. The delays subtracted may include a first delay (not shown) and a second delay (not shown). The first delay may be between a time of sending the first sensor-to-hydrophone synchronization signal 146 from the first sensor module 114a and a time of sending the first inter-sensor synchronization signal 148 from the first sensor module 114a. The second delay may be between a time of reception, at the second sensor module 114b, of the first inter-sensor synchronization signal 148 from the first sensor module 114a and a time of sending the second inter-sensor synchronization signal 152 from the second sensor module 114b.

The calculation unit may be further configured to calculate the first distance value (i.e., SR1) from the first sensor module 114a to the reference point 112 and calculate the second distance value (i.e., SR2) from the second sensor module 114b to the reference point 112, based on: (i) the first bearing angle (i.e., B1) and the second bearing angle (i.e., B2) calculated; (ii) the difference calculated between the first distance value from the first sensor module 114a to the reference point 112 and the second distance value from the second sensor module 114b to the reference point 112; and (iii) a result of the determining of which sensor module is closest to the reference point 112. To calculate the first and second distance values, the calculation unit may be further configured to solve a system of equations. Alternatively, to calculate the first and second distance values, the calculation unit may be further configured to employ a dichotomy-based process. Further example embodiments of the system 100 of FIG. 1A-1 are disclosed below with regard to FIGS. 1B-G.

FIGS. 1B-G are schematic drawings of example embodiments of the system 100 of FIG. 1A-1, disclosed above. With reference to FIG. 1A-1 and FIGS. 1B-G, in the example embodiment of FIG. 1B, the first sensor module 114a sends the first sensor-to-hydrophone data signal 144, also referred to interchangeably herein as a first sensor-to-hydrophone synchronization data signal, to the hydrophone unit 110. The first sensor-to-hydrophone data signal 144 from the first sensor module 114a may include a previously calculated distance from the first sensor module 114a to the second sensor module 114b, battery charge level, water temperature, door pitch and roll angles, depth of the first sensor module, and an echogram for non-limiting examples. The first sensor-to-hydrophone data signal 144 from the first sensor module 114a may start a synchronization protocol to measure the distance 142, which may be a spread distance between trawl doors, namely the first trawl door 140a and the second trawl door 140b.

Figures 1B, 1C, 1D, 1E, 1F, 1G:
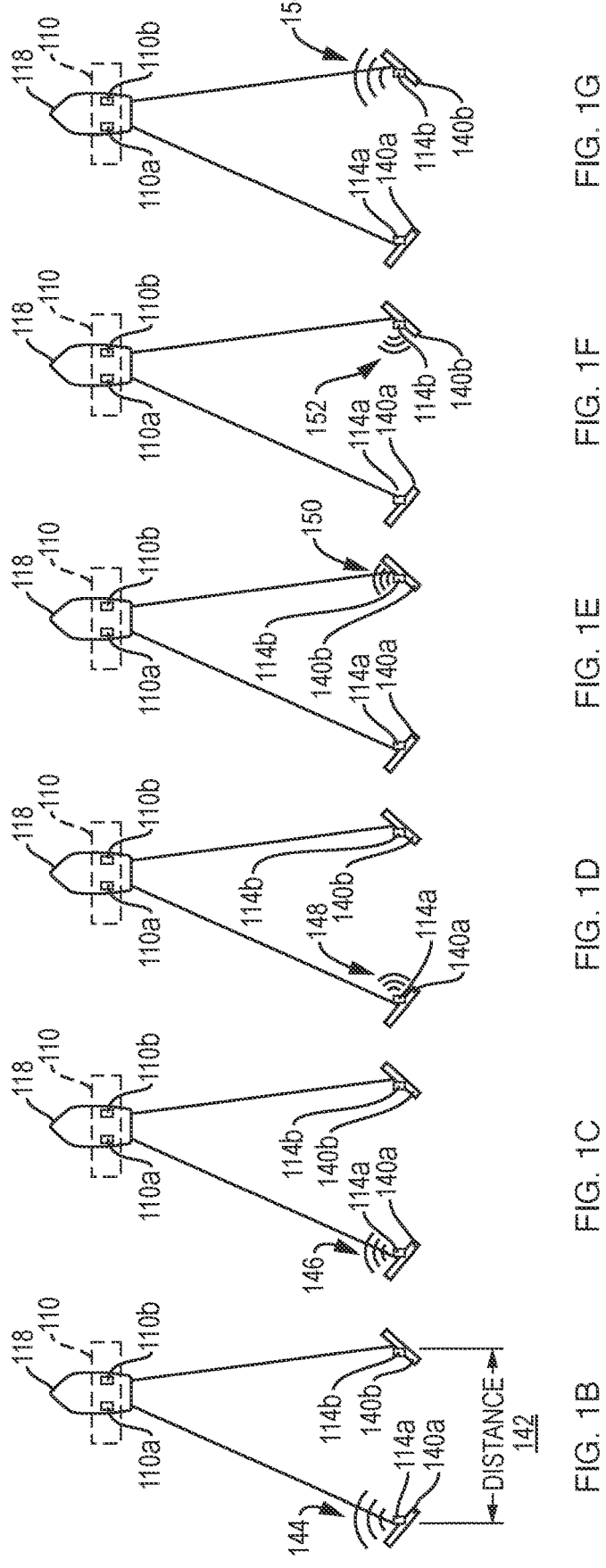
FIGS. 1B-G are schematic drawings of example embodiments of the system of FIG. 1A-1.

In the example embodiment of FIG. 1C, the first sensor module 114a sends the first sensor-to-hydrophone synchronization signal 146 to the hydrophone unit 110, either immediately following the sending of the first sensor-to-hydrophone data signal 144 from the first sensor module 114a or following a set time delay with respect to same. In the example embodiment of FIG. 1D, the first sensor module 114a sends a first inter-sensor synchronization signal 148 from the first sensor module 114a to the second sensor module 114b either immediately following the sending of the first sensor-to-hydrophone data signal 146 or following a set time delay with respect to same.

In the example embodiment of FIG. 1E, the second sensor module 114b sends a second sensor-to-hydrophone synchronization signal 150 to the hydrophone unit 110 either immediately following receipt of the first inter-sensor synchronization signal 148 from the first sensor module 114a, or following a set time delay after the second sensor module 114b receives the first synchronization signal 148 sent from the first sensor module 114a.

In the example embodiment of FIG. 1F, the second sensor module 114b sends a second inter-sensor synchronization signal 152 from the second sensor module 114b to the first sensor module 114a following a set time delay after the second sensor module 114b receives the first inter-sensor synchronization signal 148 sent from the first sensor module 114a.

In the example embodiment of FIG. 1G, the second sensor module 114b sends a second sensor-to-hydrophone data signal 154 to the hydrophone unit 110 following a set time delay after sending the second inter-sensor synchronization signal 152 from the second sensor module 114b to the first sensor module 114a. The second sensor-to-hydrophone data signal 154 may include the battery charge level, the water temperature, the door pitch and roll angles of the second trawl door 140b, the depth of the second sensor module 104b, and an echogram for non-limiting examples.

According to an example embodiment, the first sensor module 114a may be configured to measure a time value, referred to herein as $T_{22}$, that it takes from when the first inter-sensor synchronization signal 148 is sent from the first sensor module 114a until the first sensor module 114a receives the second inter-sensor synchronization signal 152 sent from the second sensor module 114b and calculates the distance 142 between the first sensor module 114a and second sensor module 114b based on the time value measured.

The distance 142 calculated may be a current distance calculated. According to an example embodiment, the first sensor-to-hydrophone data signal 144 may have been sent by the first sensor module 114a responsive to a prior distance calculated between the sensor modules 114a, 114b by the first sensor module 114b. The first sensor-to-hydrophone data signal 144 may include the prior distance calculated and a subsequent sensor-to-hydrophone data signal (not shown) may be sent from the first sensor module 114a to the hydrophone unit 110 responsive to calculation of the distance 142, that is, the current distance.

Figure 1H:
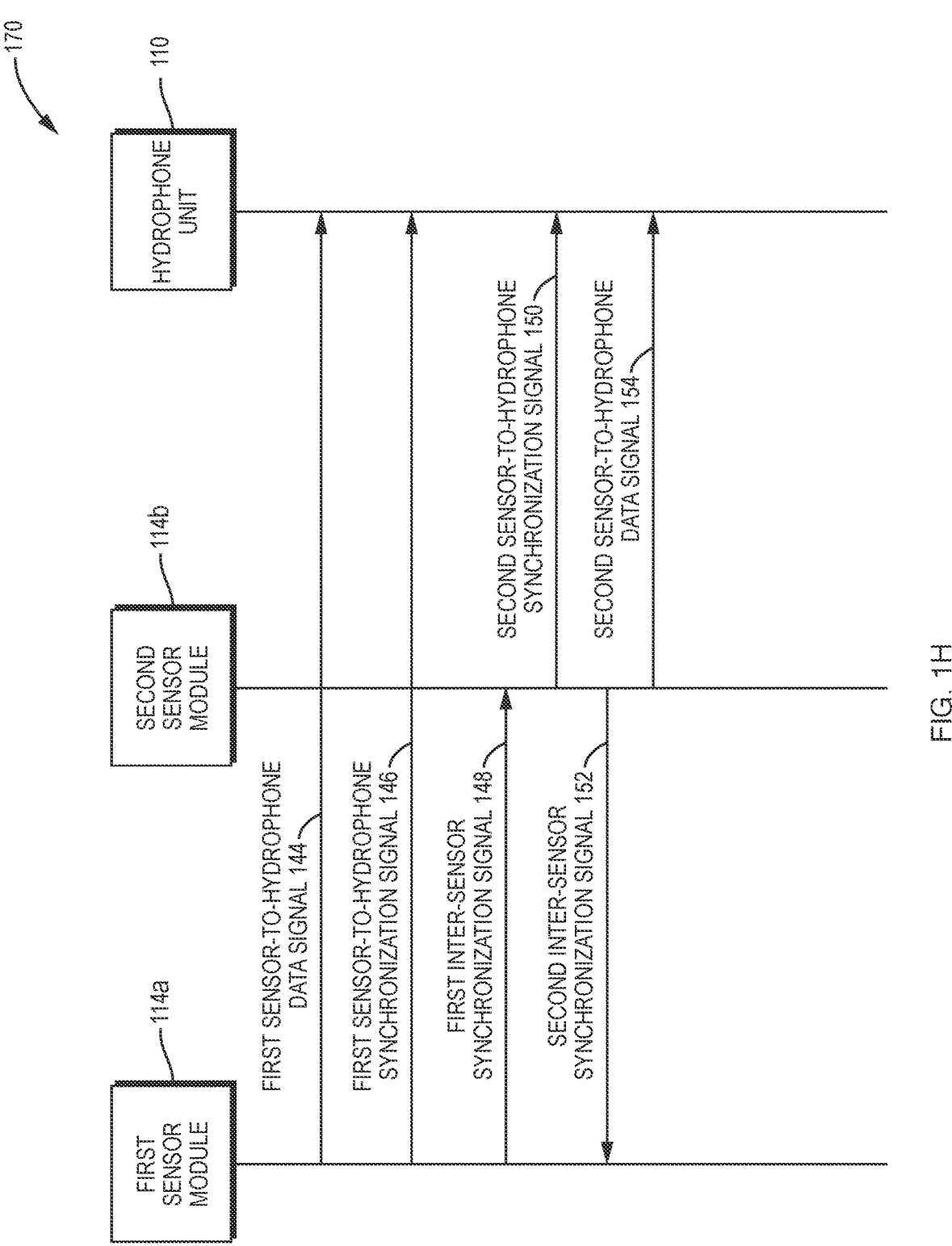
FIG. 1H is a sequence diagram of an example embodiment of a sequence of signals disclosed with regard to FIG. 1A-1 and FIGS. 1B-G.

FIG. 1H is a sequence diagram 170 of an example embodiment of a sequence of signals disclosed above with regard to FIG. 1A-1 and FIGS. 1B-G. Continuing with reference to FIG. 1A-1 and FIGS. 1B-G, the hydrophone unit 110 may include at least two hydrophones that may be separate or in a same package. The at least two hydrophones may be employed to process bearing angles in a short time space to avoid vessel yaw to have moved too much in such time. The at least two hydrophones may include a first hydrophone 110a and a second hydrophone 110b.

According to an example embodiment, each hydrophone (110a, 110b) at the reference point 112 may measure arrival times of the received synchronization signal sent by the first sensor module 114a, namely the first sensor-to-hydrophone synchronization signal 146, on each hydrophone at the reference point; and may determine a time difference of arrival used to calculate a bearing angle for the first sensor module 114a. Each hydrophone (110a, 110b) at the reference point 112 may further measure arrival times of the received synchronization signal sent by the second sensor module 114b, namely the second sensor-to-hydrophone synchronization signal 150 and may determine a time difference of arrival used to calculate a bearing angle for the second sensor module 114b. Such bearing angles are disclosed below with regard to FIG. 1I.

Figure 1J:
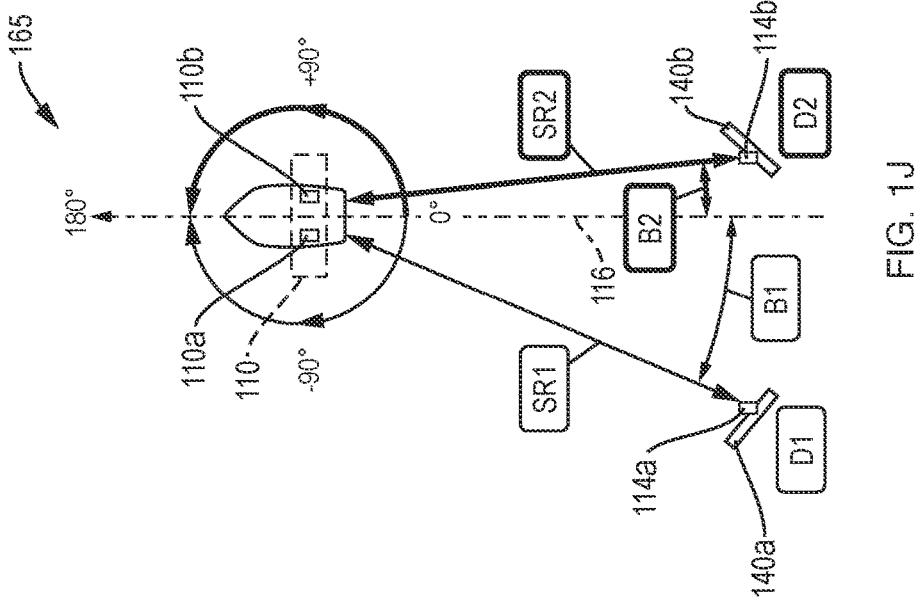
FIG. 1J is a schematic diagram of an example embodiment of slant ranges.
Figure 1I:
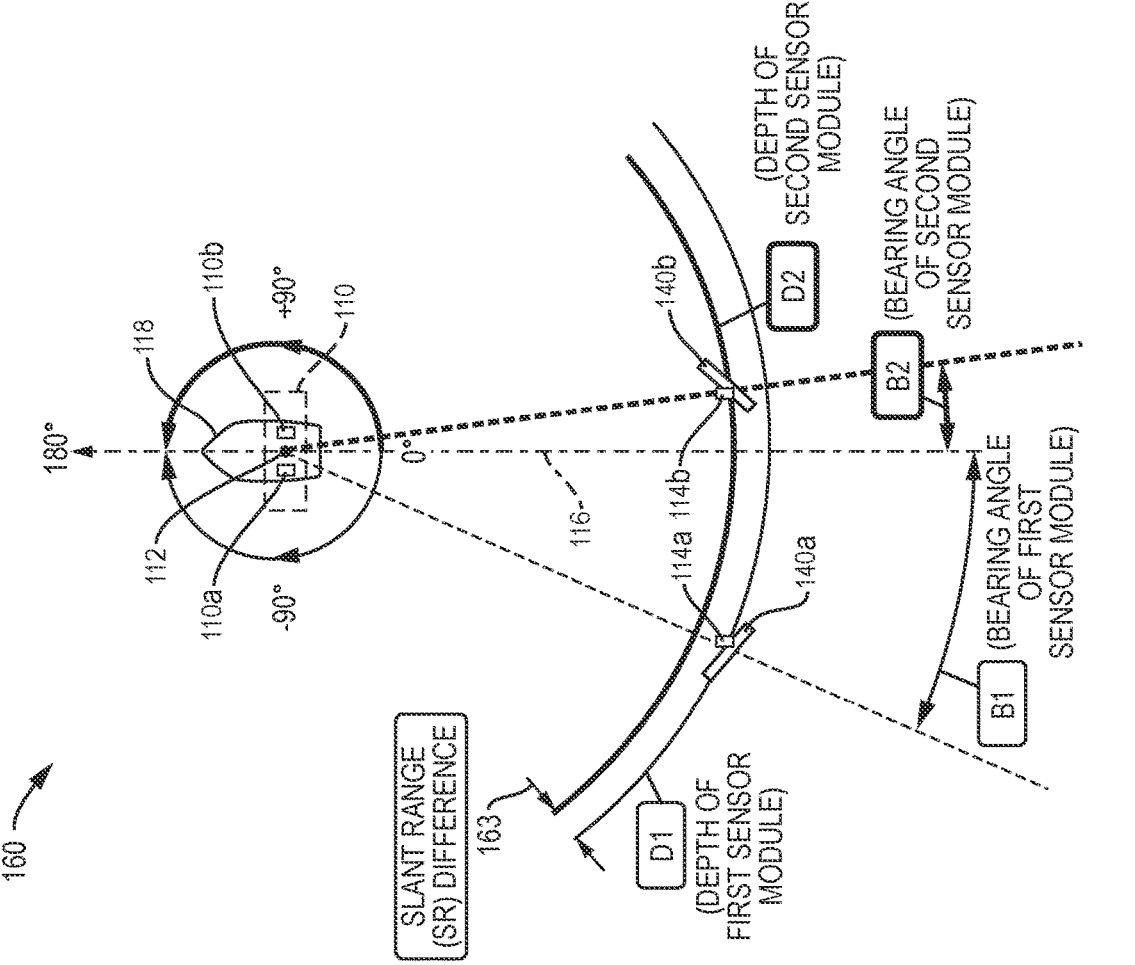
FIG. 1I is a schematic diagram of an example embodiment of bearing angles.

FIG. 1I is a schematic diagram 160 of an example embodiment of bearing angles. In the example embodiment of FIG. 1I, the first sensor module 114a is at a depth D1 underwater and the second sensor module 114b at a depth D2 underwater. The first sensor module 114a has a bearing angle B1 while the second sensor module 114b has a bearing angle B2 that may be calculated as disclosed above. A slant range (SR) difference 163 may be calculated by the hydrophone unit 110 and used to calculate slant ranges associated with the sensor modules 114a, 114b, as disclosed below with regard to FIG. 1J.

FIG. 1J is a schematic diagram 165 of an example embodiment of slant ranges. With reference to FIGS. 1I and 1J, the first sensor module 114a is at the depth D1 underwater and the second sensor module 114b at the depth D2 underwater. The first sensor module 114a has the bearing angle B1 while the second sensor module 114b has the bearing angle B2 that may be calculated as disclosed above.

According to an example embodiment, a given hydrophone of the hydrophones 110a, 110b may measure arrival times of the first sensor-to-hydrophone synchronization signal 146 and the second sensor-to-hydrophone synchronization signal 150 at the reference point 112 and determine a difference in distance values from the reference point 112 to each of the sensor modules 114a, 114b by calculating such difference in a calculating unit (not shown) that is coupled to the hydrophone unit 110 at the reference point 112. Such difference, that is the slant range (SR) difference 163, may be calculated based on the measured arrival times of the first sensor-to-hydrophone synchronization signal 146 and the second sensor-to-hydrophone synchronization signal 150 at the given hydrophone and on the distance 142 between the sensor modules 114a, 114b sent by the first sensor module 114a and optional set time delays.

The given hydrophone may further determine which sensor module of the sensor modules 114a, 114b is closer to the vessel 118 by determining which sensor module has a shorter SR. The bearing angles B1, B2, difference in distance from the first sensor module to the second sensor module relative to the reference point 112, that is the SR difference 163, may be used by the hydrophone unit 110 to calculate a first SR of the first sensor module 114a, namely SR1, and a second SR of the second sensor module 114b, namely SR2. Such slant ranges may be calculated by solving an equation system or by employing a dichotomy process for non-limiting examples.

FIGS. 2A-F represent a chronogram 200 of example embodiments of a system for underwater distance determination, such as the system 100 of FIG. 1A-1, disclosed above. In the chronogram 200, signals between a boat receiver 210, first node $N_1$ 214a, and second node $N_2$ 214b are shown over time t 201. The first node $N_1$ 214a is a first sensor module and the second node $N_2$ 214b is a second sensor module which may be the first sensor module 114a and second sensor module 114b, respectively, of FIG. 1A-1, disclosed above. With reference to FIG. 1A-1 and FIG. 2A, the boat receiver 210 may be the hydrophone unit 110 at the reference point 112 of the vessel 118.

With reference to FIG. 2A, at ①, the first node $N_1$ 214a sends a first sensor-to-hydrophone data signal 244, also referred to interchangeably herein as a first sensor-to-hydrophone synchronization data signal, to the boat receiver 210. The first sensor-to-hydrophone data signal 244 may include a previously calculated distance to the second node $N_2$ 214b from the first node $N_1$ 214a, battery charge level, water temperature, pitch/roll angles, depth of the first node $N_1$ 214a, and an echogram for non-limiting examples.

At ②, the first node $N_1$ 214a sends a first sensor-to-hydrophone synchronization signal 246 to the boat receiver 210, either immediately following the sending of the first sensor-to-hydrophone data signal 244 or following a set time delay with respect to same. The boat receiver 210 may include at least two hydrophones (not shown) and an arrival time of the first sensor-to-hydrophone synchronization signal 246 may be measured on each hydrophone. Such arrival times may be used to determine a difference in arrival of same to calculate a bearing angle 221 for the first node $N_1$ 214a as shown in the plot 205 of FIG. 2B. Such calculation may be performed by a calculation unit (not shown) at the boat receiver 210.

Continuing with reference to the chronogram 200 of FIG. 2A, at ③, the first node $N_1$ 214a sends a first inter-sensor synchronization signal 248 to the second node $N_2$ 214b, either immediately following the sending of the first sensor-to-hydrophone data signal 246 or following a set time delay 249.

At ④, the second node $N_2$ 214b sends a second sensor-to-hydrophone synchronization signal 250 to the boat receiver 210 either immediately following receipt of the first inter-sensor synchronization signal 248 from first node $N_1$ 214a or following a set time delay. An arrival time of the second sensor-to-hydrophone synchronization signal 250 may be measured on each hydrophone of the boat receiver 210. Such arrival times may be used to determine a difference in arrival of same to calculate a bearing angle 223 for the second node $N_2$ 214b as shown in the plot 207 of FIG. 2C. Such calculation may be performed by the calculation unit at the boat receiver 210.

The arrival times of the first sensor-to-hydrophone synchronization signal 246 and the second sensor-to-hydrophone synchronization signal 250 may be measured on one hydrophone at the boat receiver 210. The calculation unit may, in turn, determine a difference in distance values from a reference point of the boat receiver 210 to the first node $N_1$ 214a and the second node $N_2$ 214b based on the measured arrival times on the hydrophone and the distance between the first node $N_1$ 214a and the second node $N_2$ 214b included in the first sensor-to-hydrophone data signal 244 sent at ① in the chronogram 200, and optional set time delays. Such distance is shown in FIG. 2D as the slant range (SR) difference 262.

Continuing with reference to the chronogram 200 of FIG. 2A, at ⑤, the second node $N_2$ 214b sends a second inter-sensor synchronization signal 252 to the first node $N_1$ 214a following a set time delay 251. At ⑥, the second node $N_2$ 214b sends a second sensor-to-hydrophone data signal 254 to the boat receiver 210. The second sensor-to-hydrophone data signal 254 may include the battery charge level, water temperature, pitch/roll angles, a depth of the second node $N_2$ 214b, and an echogram, for non-limiting examples. At ⑦, the first node $N_1$ 214a (i) measures a time value $T_{22}$ representing a total travel time of the first inter-sensor synchronization signal 248 and the second synchronization signal 252 and (ii) calculates a distance 242 between the first node $N_1$ 214a and the second node $N_2$ 214b based on the time value $T_{22}$ measured. The time value $T_{22}$ measured may include the $t_{resp.delay}$ 253 value as well as time delays 255, 257. Such distance 242 may be communicated by the first node $N_1$ 214a to the boat receiver 210 in a subsequent sensor-to-hydrophone data signal 244' sent at ①' in the chronogram 200 and is shown in the plot 211 of FIG. 2E.

As shown in the plot 213 of FIG. 2F, the first bearing angle 221, second bearing angle 223, distance 242 from the first node $N_1$ 214a to the second node $N_2$ 214b may be used by the calculation unit to calculate a first $SR_1$ 233 of the first node $N_1$ 214a and a second $SR_2$ of the second node $N_2$ 214b. Such slant ranges, namely the first SR1 233 and second SR2 may be calculated by solving an equation system or by employing a dichotomy process for non-limiting examples.

Figure 3A:
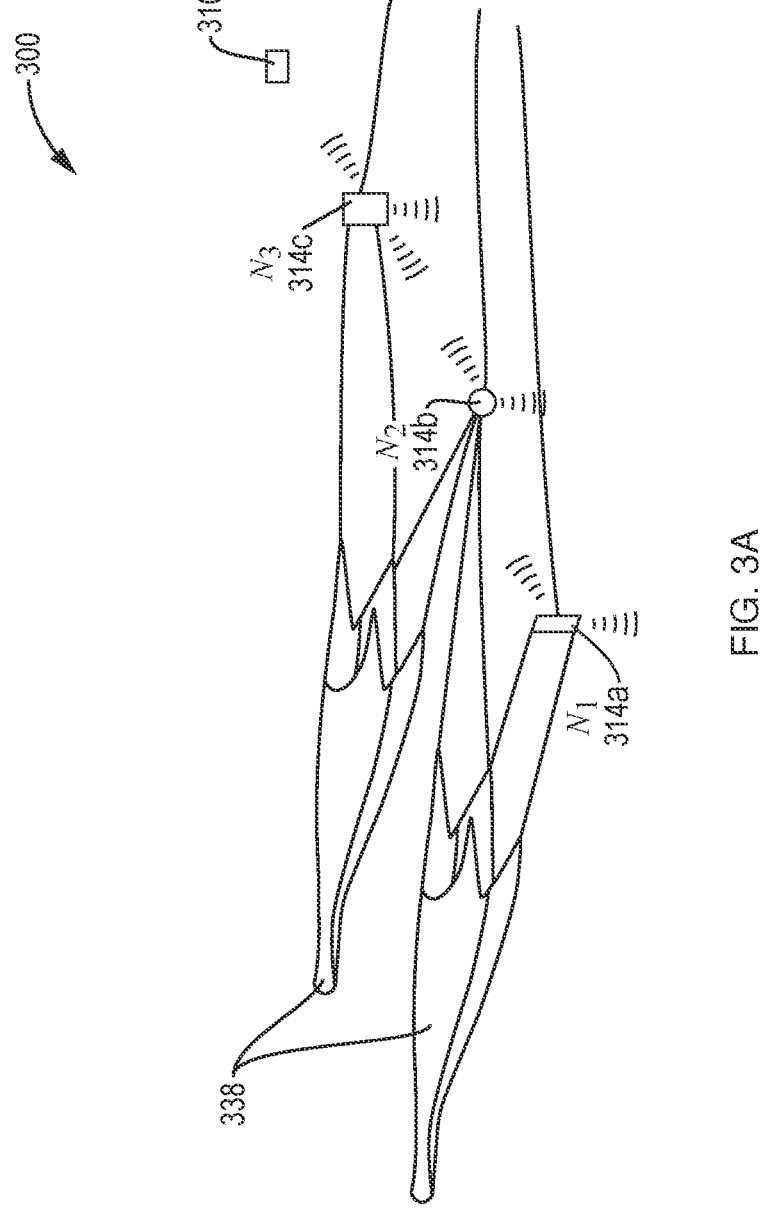
FIG. 3A is a schematic diagram of sensor modules being towed behind a twin trawl configuration.

FIG. 3A is a schematic diagram 300 of sensor modules being towed behind a twin trawl configuration 338. The sensor modules may be referred to interchangeably herein as nodes and include a first node $N_1$ 314a, second node $N_2$ 314b, and third node $N_3$ 314c. Such nodes comprise means for communication with each other and a boat receiver 310. The boat receiver 310 be a hydrophone unit that includes at least two hydrophones (not shown).

Figure 3B:
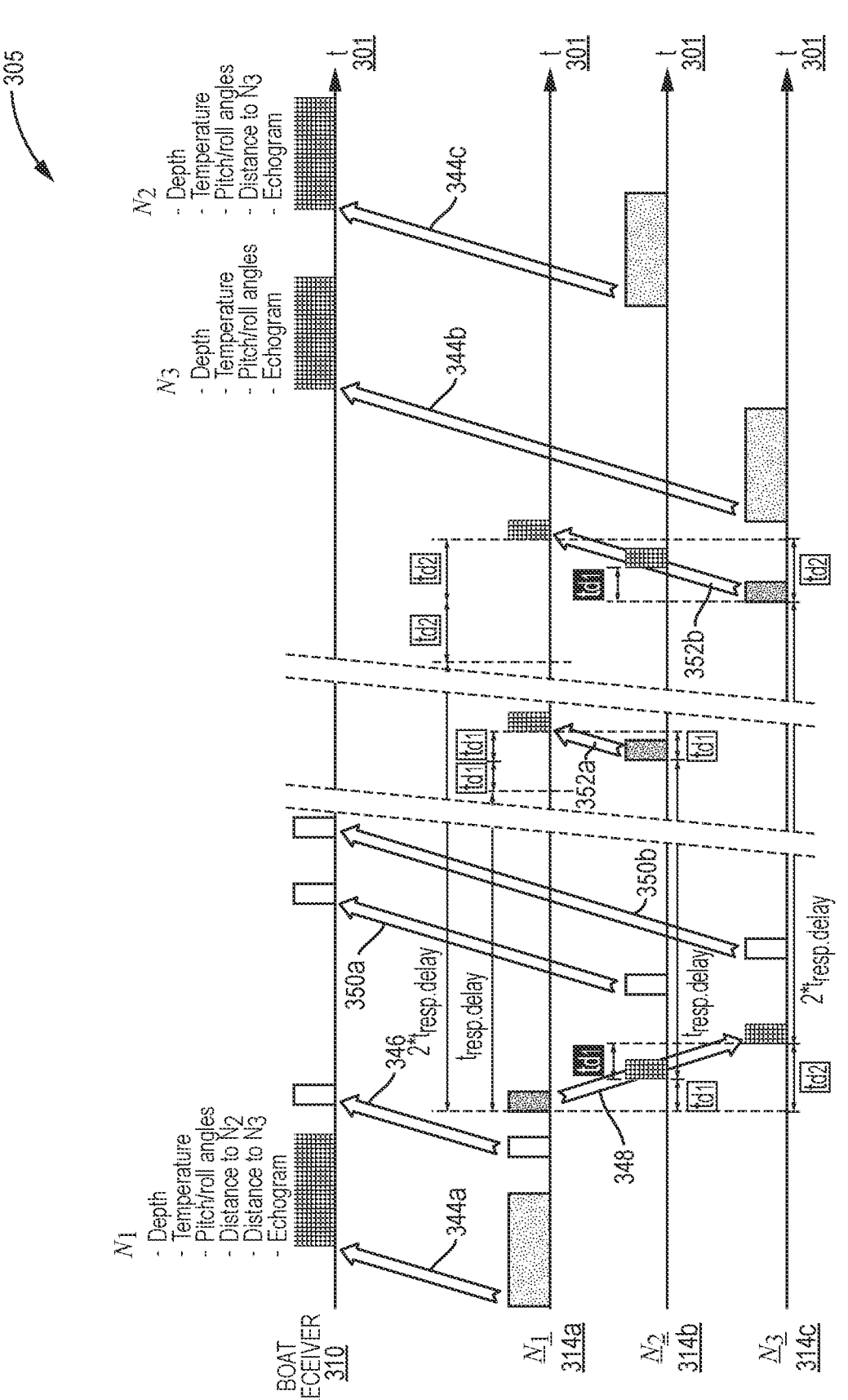
FIG. 3B is a chronogram of example embodiments of the twin trawl configuration of FIG. 3A.

FIG. 3B is a chronogram 305 of example embodiments of the twin trawl configuration 338 of FIG. 3A over time t 301. In the chronogram 305, the first node $N_1$ 314a sends a first sensor-to-hydrophone data signal 344a to the boat receiver 310. The first sensor-to-hydrophone data signal 344a may include a previously calculated distance to the second node $N_2$ 314b from the first node $N_1$ 314a, a previously calculated distance to the third node $N_3$ 314c from the first node $N_1$ 314a, battery charge level, water temperature, pitch/roll angles, depth of the first node $N_1$ 314a, and an echogram for non-limiting examples.

The first node $N_1$ 314a sends a first sensor-to-hydrophone synchronization signal 346 to the boat receiver 310, either immediately following the sending of the first sensor-to-hydrophone data signal 344a or following a set time delay with respect to same. The boat receiver 310 may include at least two hydrophones (not shown) and an arrival time of the first sensor-to-hydrophone synchronization signal 346 may be measured on each hydrophone. Such arrival times may be used to determine a difference in arrival of same to calculate a bearing angle (not shown) for the first node $N_1$ 314a. Such calculation may be performed by a calculation unit (not shown) at the boat receiver 310.

Continuing with the chronogram 305, the first node $N_1$ 314a sends a first inter-sensor synchronization signal 348 to the second node $N_2$ 314b and the third node $N_3$ 314c, either immediately following the sending of the first sensor-to-hydrophone data signal 346 or following a set time. The second node $N_2$ 314b sends a second sensor-to-hydrophone synchronization signal 350a to the boat receiver 310 either immediately following receipt of the first inter-sensor synchronization signal 348 from the first node $N_1$ 314a or following a set time delay. An arrival time of the second sensor-to-hydrophone synchronization signal 350a may be measured on each hydrophone of the boat receiver 310. Such arrival times may be used to determine a difference in arrival of same to calculate a bearing angle (not shown) for the second node $N_2$ 314b. Such calculation may be performed by the calculation unit at the boat receiver 310.

Similarly, the third node $N_3$ 314c sends a third sensor-to-hydrophone synchronization signal 350b to the boat receiver 310 either immediately following receipt of the first inter-sensor synchronization signal 348 from the first node $N_1$ 314a or following a set time delay. An arrival time of the third sensor-to-hydrophone synchronization signal 350b may be measured on each hydrophone of the boat receiver 310. Such arrival times may be used to determine a difference in arrival of same to calculate a bearing angle (not shown) for the third node $N_3$ 314c. Such calculation may be performed by the calculation unit at the boat receiver 310.

The arrival times of the first sensor-to-hydrophone synchronization signal 346, the second sensor-to-hydrophone synchronization signal 350a, and the third sensor-to-hydrophone synchronization signal 350b may be measured on one hydrophone at the boat receiver 210. The calculation unit may, in turn, determine a respective difference in distance values from a reference point of the boat receiver 310 to the first node $N_1$ 314a, the second node $N_2$ 314b, and the third node $N_3$ 314c based on the measured arrival times on the hydrophone and the distance between the first node $N_1$ 314a and the second node $N_2$ 314b and the distance between the first node $N_1$ 314a and the third node $N_3$ 314c included in the first sensor-to-hydrophone data signal 344a, and optional set time delays.

Continuing with reference to the chronogram 305, the second node $N_2$ 314b sends a second inter-sensor synchronization signal 352a to the first node $N_1$ 314a. The third node $N_3$ 314c sends a third inter-sensor synchronization signal 352b to the first node $N_1$ 314a and the second node $N_2$ 314b. The third node $N_3$ 314c sends a second sensor-to-hydrophone data signal 354b to the boat receiver 210. The second node $N_2$ 314b sends a third sensor-to-hydrophone data signal 354c to the boat receiver 310. The second sensor-to-hydrophone data signal 354b may include the battery charge level, water temperature, pitch/roll angles, a depth of the third node $N_3$ 314c, and an echogram, for non-limiting examples. The third sensor-to-hydrophone data signal 354c may include the battery charge level, water temperature, pitch/roll angles, a depth of the second node $N_2$ 314b, a distance to the third node $N_3$ 314c, and an echogram, for non-limiting examples.

The first node $N_1$ 314a (i) measures a time value $T_{22}$ representing a total travel time of the first inter-sensor synchronization signal 348 and the second synchronization signal 352a and (ii) calculates a distance between the first node $N_1$ 314a and the second node $N_2$ 314b based on the time value $T_{22}$ measured. Similarly, the first node $N_1$ 314a (i) measures a time value $T_{23}$ representing a total travel time of the first inter-sensor synchronization signal 348 and the third synchronization signal 352b and (ii) calculates a distance between the first node $N_1$ 314a and the third node $N_3$ 314c based on the time value $T_{23}$ measured.

FIG. 4 is a flow diagram of an example embodiment of a method 400 for underwater distance determination. The method begins (402) and comprises sending (402) a first sensor-to-hydrophone data signal from a first sensor module of a pair of sensor modules to a hydrophone unit located at a reference point. The pair of sensor modules and hydrophone unit are located underwater. The method further comprises sending (404) a first sensor-to-hydrophone synchronization signal from the first sensor module to the hydrophone unit located at the reference point; sending (406) first inter-sensor synchronization signal from the first sensor module to a second sensor module of the pair of sensor modules; sending (408) a second sensor-to-hydrophone synchronization signal from the second sensor module to the hydrophone unit responsive to receipt of the first inter-sensor synchronization signal from the first sensor module; sending (410) a second inter-sensor synchronization signal from the second sensor module to the first sensor module responsive to receipt of the first inter-sensor synchronization signal from the first sensor module; and sending (412) a second sensor-to-hydrophone data signal from the second sensor module to the hydrophone unit. The method further comprises, at the first sensor module, (i) measuring (414) a time value $T_{22}$ representing a total travel time of the first inter-sensor synchronization signal from the first sensor module and second synchronization signal from the second sensor module and (ii) calculating (416) a distance between the first sensor module and second sensor module based on the time value $T_{22}$ measured. The method thereafter ends (418) in the example embodiment.

The hydrophone unit may include at least two hydrophones and the method may further comprise employing the at least two hydrophones to measure a first bearing angle and a second bearing angle of the first sensor module and second sensor module, respectively. The first bearing angle and second bearing angle are relative to the reference point.

The method may further comprise measuring, at a first hydrophone of the at least two hydrophones, a time value $T_{1A}$ representing an arrival time at the first hydrophone of the first sensor-to-hydrophone synchronization signal from the first sensor module. The method may further comprise measuring, at a second hydrophone of the at least two hydrophones, a time value $T_{1B}$ representing an arrival time at the second hydrophone of the first sensor-to-hydrophone synchronization signal from the first sensor module. The method may further comprise calculating, based on the time value $T_{1A}$ and the time value $T_{1B}$, a first bearing angle of the first sensor module relative to the reference point. The reference point located may be located on an axis. The method may further comprise measuring, at the first hydrophone, a time value $T_{2A}$ representing an arrival time at the first hydrophone of the second sensor-to-hydrophone synchronization signal from the second sensor module. The method may further comprise measuring, at the second hydrophone, a time value $T_{2B}$ representing an arrival time at the second hydrophone of the second sensor-to-hydrophone synchronization signal from the second sensor module and calculating, based on $T_{2A}$ and $T_{2B}$, a second bearing angle of the second sensor module relative to the reference point located on the axis.

The first sensor-to-hydrophone data signal may include a first distance value representing a previously known distance between the first sensor module and the second sensor module. The method may further comprise calculating a difference between a first distance value from the first sensor module to the reference point and a second distance value from the second sensor module to the reference point based on the previous distance value, the time value $T_{1A}$, the time value $T_{1B}$, the time value $T_{2A}$, and the time value $T_{2B}$. The method may further comprise determining which sensor module, of the first and second sensor modules, is closest to the reference point based on the difference calculated.

Calculating the difference may include subtracting delays that are not due to acoustic wave travel. The delays subtracted may include a first delay and a second delay. The first delay may be between a time of sending the first sensor-to-hydrophone synchronization signal from the first sensor module and a time of sending the first inter-sensor synchronization signal from the first sensor module. The second delay may be between a time of reception, at the second sensor module of the first inter-sensor synchronization signal from the first sensor module and a time of sending the second inter-sensor synchronization signal from the second sensor module.

The method may further comprise calculating the first distance value from the first sensor module to the reference point and calculating the second distance value from the second sensor module to the reference point, based on: (i) the first and second bearing angles calculated; (ii) the difference calculated between the first distance value from the first sensor module to the reference point and the second distance value from the second sensor module to the reference point; and (iii) a result of the determining of which sensor module is closest to the reference point. Calculating the first and second distance values may include solving a system of equations. Calculating the first and second distance values may include employing a dichotomy-based process.

Figure 5:
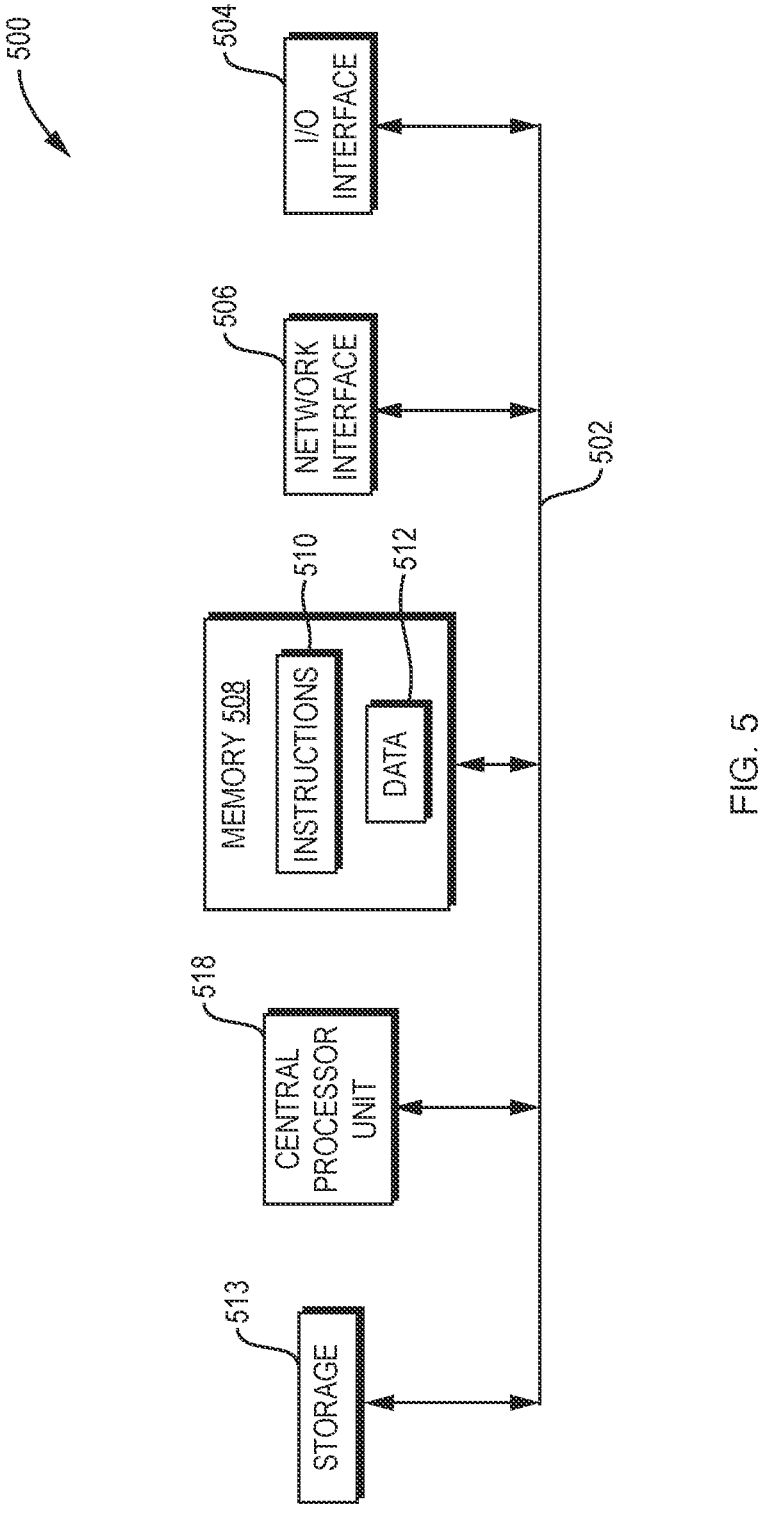
FIG. 5 is a block diagram of an example of the internal structure of a computer in which various embodiments of the present disclosure may be implemented.

FIG. 5 is a block diagram of an example of an internal structure of a computer 500 in which various embodiments of the present disclosure may be implemented. The computer 500 contains a system bus 502, where a bus is a set of hardware lines used for data transfer among the components of a computer or digital processing system. The system bus 502 is essentially a shared conduit that connects different elements of a computer system (e.g., processor, disk storage, memory, input/output ports, network ports, etc.) that enables the transfer of information between the elements. Coupled to the system bus 502 is an I/O device interface 504 for connecting various input and output devices (e.g., keyboard, mouse, display monitors, printers, speakers, microphone, etc.) to the computer 500. A network interface 506 allows the computer 500 to connect to various other devices attached to a network (e.g., global computer network, wide area network, local area network, etc.). Memory 508 provides volatile or non-volatile storage for computer software instructions 510 and data 512 that may be used to implement embodiments (e.g., method 200) of the present disclosure, where the volatile and non-volatile memories are examples of non-transitory media. Disk storage 513 also provides non-volatile storage for the computer software instructions 510 and data 512 that may be used to implement embodiments (e.g., method 400) of the present disclosure. A central processor unit 518 is also coupled to the system bus 502 and provides for the execution of computer instructions.

Further example embodiments disclosed herein may be configured using a computer program product; for example, controls may be programmed in software for implementing example embodiments. Further example embodiments may include a non-transitory computer-readable-medium that contains instructions that may be executed by a processor, and, when loaded and executed, cause the processor to complete methods and techniques described herein. It should be understood that elements of the block and flow diagrams may be implemented in software or hardware, such as via one or more arrangements of the circuitry of FIG. 5, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer-readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:

1. A method for underwater distance determination, the method comprising:
    sending a first sensor-to-hydrophone data signal from a first sensor module of a pair of sensor modules to a hydrophone unit located at a reference point, the pair of sensor modules and hydrophone unit located underwater, the hydrophone unit including at least two hydrophones;

sending a first sensor-to-hydrophone synchronization signal from the first sensor module to the hydrophone unit located at the reference point;
    sending a first inter-sensor synchronization signal from the first sensor module to a second sensor module of the pair of sensor modules;
    sending a second sensor-to-hydrophone synchronization signal from the second sensor module to the hydrophone unit responsive to receipt of the first inter-sensor synchronization signal from the first sensor module;
    sending a second inter-sensor synchronization signal from the second sensor module to the first sensor module responsive to receipt of the first inter-sensor synchronization signal from the first sensor module;
    sending a second sensor-to-hydrophone data signal from the second sensor module to the hydrophone unit;
    employing the at least two hydrophones to measure a first bearing angle and a second bearing angle of the first sensor module and second sensor module, respectively, the first bearing angle and second bearing angle relative to the reference point; and
    at the first sensor module:
        (i) measuring a time value $T_{22}$ representing a total travel time of the first inter-sensor synchronization signal from the first sensor module and second inter-sensor synchronization signal from the second sensor module; and
        (ii) calculating a distance between the first sensor module and second sensor module based on the time value $T_{22}$ measured.

2. The method of claim 1, wherein the method further comprises:
    measuring, at a first hydrophone of the at least two hydrophones, a time value $T_{1A}$ representing an arrival time at the first hydrophone of the first sensor-to-hydrophone synchronization signal from the first sensor module;
    measuring, at a second hydrophone of the at least two hydrophones, a time value $T_{1B}$ representing an arrival time at the second hydrophone of the first sensor-to-hydrophone synchronization signal from the first sensor module;
    calculating, based on the time value $T_{1A}$ and the time value $T_{1B}$, the first bearing angle of the first sensor module relative to the reference point, the reference point located on an axis;
    measuring, at the first hydrophone, a time value $T_{2A}$ representing an arrival time at the first hydrophone of the second sensor-to-hydrophone synchronization signal from the second sensor module;
    measuring, at the second hydrophone, a time value $T_{2B}$ representing an arrival time at the second hydrophone of the second sensor-to-hydrophone synchronization signal from the second sensor module; and
    calculating, based on $T_{2A}$ and $T_{2B}$, the second bearing angle of the second sensor module relative to the reference point located on the axis.

3. The method of claim 2, wherein the first sensor-to-hydrophone data signal includes a previous distance value representing a previously known distance between the first sensor module and the second sensor module and wherein the method further comprises:
    calculating a difference between a first distance value from the first sensor module to the reference point and a second distance value from the second sensor module to the reference point based on the previous distance value, the time value $T_{1A}$, the time value $T_{1B}$, the time value $T_{2A}$, and the time value $T_{2B}$; and determining which sensor module, of the first and second sensor modules, is closest to the reference point based on the difference calculated.

4. The method of claim 3, wherein calculating the difference includes subtracting delays that are not due to acoustic wave travel, wherein the delays subtracted include a first delay and a second delay, wherein the first delay is between a time of sending the first sensor-to-hydrophone synchronization signal from the first sensor module and a time of sending the first inter-sensor synchronization signal from the first sensor module, and wherein the second delay is between a time of reception, at the second sensor module, of the first inter-sensor synchronization signal from the first sensor module and a time of sending the second inter-sensor synchronization signal from the second sensor module.

5. The method of claim 3, further comprising:

calculating the first distance value from the first sensor module to the reference point and calculating the second distance value from the second sensor module to the reference point, based on:

(i) the first and second bearing angles calculated;

(ii) the difference calculated between the first distance value from the first sensor module to the reference point and the second distance value from the second sensor module to the reference point; and (iii) a result of the determining of which sensor module is closest to the reference point.

6. The method of claim 5, wherein calculating the first and second distance values includes solving a system of equations.

7. The method of claim 5, wherein calculating the first and second distance values includes employing a dichotomy-based process.

8. The method of claim 1, wherein the first sensor-to-hydrophone data signal includes a previous distance value representing a previously known distance between the first sensor module and the second sensor module and at least one of: a battery charge level, a temperature value of water surrounding the first sensor module, values representing pitch and roll angles of the first sensor module, a value representing depth of the first sensor module, and data of an echogram recorded at the first sensor module.

9. The method of claim 1, wherein the second sensor-to-hydrophone data signal includes at least one of: a battery charge level, a temperature value of water surrounding the second sensor module, values representing pitch and roll angles of the second sensor module, a value representing depth of the second sensor module, and data of an echogram recorded at the second sensor module.

10. A system for underwater distance determination, the system comprising:

a hydrophone unit located at a reference point, the hydrophone unit including at least two hydrophones;

a calculation unit; and a pair of sensor modules, the pair of sensor modules and hydrophone unit located underwater, a first sensor module of the pair of sensor modules configured to send a first sensor-to-hydrophone data signal and a first sensor-to-hydrophone synchronization signal to the hydrophone unit at the reference point and to send a first inter-sensor synchronization signal from the first sensor module to a second sensor module of the pair of sensor modules, the second sensor module configured to send, responsive to receipt of the first inter-sensor synchronization signal from the first sensor module, a second inter-sensor synchronization signal from the second sensor module to the first sensor module, the second sensor module further configured to send a second sensor-to-hydrophone data signal from the second sensor module to the hydrophone unit, the calculation unit configured to employ the at least two hydrophones to measure a first bearing angle and a second bearing angle of the first sensor module and second sensor module, respectively, the first bearing angle and second bearing angle relative to the reference point, the first sensor module further configured to:

(i) measure a time value $T_{22}$ representing a total travel time of the first inter-sensor synchronization signal from the first sensor module and second synchronization signal from the second sensor module; and (ii) calculate a distance between the first sensor module and second sensor module based on the time value $T_{22}$ measured.

11. The system of claim 10, wherein the system further comprises a calculation unit, and wherein:

a first hydrophone of the at least two hydrophones is configured to measure a time value $T_{1A}$ representing an arrival time at the first hydrophone of the first sensor-to-hydrophone synchronization signal from the first sensor module;

a second hydrophone of the at least two hydrophones is configured to measure a time value $T_{1B}$ representing an arrival time at the second hydrophone of the first sensor-to-hydrophone synchronization signal from the first sensor module;

the calculating unit is configured to calculate, based on the time value $T_{1A}$ and the time value $T_{1B}$, the first bearing angle of the first sensor module relative to the reference point, the reference point located on an axis;

the first hydrophone is further configured to measure a time value $T_{2A}$ representing an arrival time at the first hydrophone of the second sensor-to-hydrophone synchronization signal from the second sensor module;

the second hydrophone is further configured to measure a time value $T_{2B}$ representing an arrival time at the second hydrophone of the second sensor-to-hydrophone synchronization signal from the second sensor module; and the calculation unit is further configured to calculate, based on $T_{2A}$ and $T_{2B}$, the second bearing angle of the second sensor module relative to the reference point located on the axis.

12. The system of claim 11, wherein the first sensor-to-hydrophone data signal includes a previous distance value representing a previously known distance between the first sensor module and the second sensor module and wherein the calculation unit is further configured to:

calculate a difference between a first distance value from the first sensor module to the reference point and a second distance value from the second sensor module to the reference point based on the previous distance value, the time value $T_{1A}$, the time value $T_{1B}$, the time value $T_{2A}$, and the time value $T_{2B}$; and determine which sensor module, of the first and second sensor modules, is closest to the reference point based on the difference calculated.

13. The system of claim 12, wherein, to calculate the difference, the calculation unit is further configured to subtract delays that are not due to acoustic wave travel, wherein the delays subtracted include a first delay and a second delay, wherein the first delay is between a time of sending the first sensor-to-hydrophone synchronization signal from the first sensor module and a time of sending the first inter-sensor synchronization signal from the first sensor module, and wherein the second delay is between a time of reception, at the second sensor module, of the first inter-sensor synchronization signal from the first sensor module and a time of sending the second inter-sensor synchronization signal from the second sensor module.

14. The system of claim 12, wherein the calculation unit is further configured to:

calculate the first distance value from the first sensor module to the reference point and calculate the second distance value from the second sensor module to the reference point, based on:

(i) the first and second bearing angles calculated;

(ii) the difference calculated between the first distance value from the first sensor module to the reference point and the second distance value from the second sensor module to the reference point; and (iii) a result of the determining of which sensor module is closest to the reference point.

15. The system of claim 14, wherein, to calculate the first and second distance values, the calculation unit is further configured to solve a system of equations.

16. The system of claim 14, wherein, to calculate the first and second distance values, the calculation unit is further configured to employ a dichotomy-based process.

17. The system of claim 10, wherein the first sensor-to-hydrophone data signal includes a previous distance value representing a previously known distance between the first sensor module and the second sensor module and at least one of: a battery charge level, a temperature value of water surrounding the first sensor module, values representing pitch and roll angles of the first sensor module, a value representing depth of the first sensor module, and data of an echogram recorded at the first sensor module.

18. The system of claim 10, wherein the second sensor-to-hydrophone data signal includes at least one of: a battery charge level, a temperature value of water surrounding the second sensor module, values representing pitch and roll angles of the second sensor module, a value representing depth of the second sensor module, and data of an echogram recorded at the second sensor module.

* * * * *